US006502352B1

(12) United States Patent
Bonduel

(10) Patent No.: US 6,502,352 B1
(45) Date of Patent: Jan. 7, 2003

(54) ELECTRIC WINDOW REGULATOR HAVING A SPRING FOR INCREASING THE TIME IN WHICH AN ANTI-PINCHING SYSTEM CAN OPERATE

(75) Inventor: Pascal Bonduel, Bouzy la Foret (FR)

(73) Assignee: Meritor Light Vehicle Systems - France, Paris la Defense 2 (FR)

( * ) Notice: Subject to any disclaimer, the term of this patent is extended or adjusted under 35 U.S.C. 154(b) by 0 days.

(21) Appl. No.: 09/254,159

(22) PCT Filed: Jun. 15, 1998

(86) PCT No.: PCT/FR98/01254

§ 371 (c)(1),
(2), (4) Date: Nov. 23, 1999

(87) PCT Pub. No.: WO99/01637

PCT Pub. Date: Jan. 14, 1999

(30) Foreign Application Priority Data

Jul. 4, 1997 (FR) .............................................. 97 08528

(51) Int. Cl.[7] .................................................... F16P 5/00
(52) U.S. Cl. ................................ 49/26; 49/28; 49/375; 49/351
(58) Field of Search ................................ 49/26, 27, 28, 49/375, 358, 374, 351, 352; 52/716.5

(56) References Cited

U.S. PATENT DOCUMENTS 2,282,240 A * 5/1942 Parsons ......................... 92/84
2,324,145 A * 7/1943 Floraday ......................... 49/26
2,911,212 A * 11/1959 Forster .......................... 49/28
4,199,899 A * 4/1980 Muhling et al. .............. 49/352
4,631,864 A * 12/1986 Barros ......................... 49/352
4,637,166 A * 1/1987 Ujihara ........................ 49/352
4,805,346 A * 2/1989 Gergoe ........................ 49/352
4,984,386 A * 1/1991 Marscholl et al. ............ 49/352
5,296,658 A 3/1994 Kramer et al.
5,461,826 A * 10/1995 Heckel et al. ................. 49/28
5,469,656 A * 11/1995 Gier et al. ...................... 49/28
5,477,641 A * 12/1995 Heckel et al. ................. 49/28
5,528,861 A * 6/1996 Beyerlein .................... 49/352
5,623,785 A * 4/1997 Mariel ......................... 49/352
5,657,580 A * 8/1997 Kobrehel ..................... 49/352
5,694,717 A * 12/1997 Gier ............................ 49/352
5,740,630 A * 4/1998 Medebach ................... 49/352
5,749,174 A * 5/1998 Mariel ......................... 49/352
5,778,600 A * 7/1998 Chu ............................ 49/352
5,950,365 A * 9/1999 Liem et al. ..................... 49/28
6,041,549 A * 3/2000 Schust et al. ................ 49/375

FOREIGN PATENT DOCUMENTS

EP 579518 A1 6/1993
EP 604272 A1 12/1993
FR 2693535 A1 1/1994

* cited by examiner

*Primary Examiner*—Gregory J Strimbu
(74) *Attorney, Agent, or Firm*—Carlson, Gaskey & Olds

(57) ABSTRACT

A motor vehicle power-operated window lift, comprises a mechanism for driving the window, an electric motor (3), an anti-pinch system which can be triggered when there is an obstacle obstructing the window travel, and an electronic circuit for controlling the motor and the anti-pinch system. The window lift comprises a spring to reduce the pinch force when the window is being raised. In one example, the spring associated with a top sheath has a stiffness of about at least 10N/mm, and is fully compressed only in response to a compression force of about at least 250 Newtons. The spring constitutes a shock absorber in case of a strong impact, transforming it into a relatively mild impact, thereby providing more time for the electronic circuit controlling the anti-pinch system to intervene and reduce the pinch force.

5 Claims, 5 Drawing Sheets

ELECTRIC WINDOW REGULATOR HAVING A SPRING FOR INCREASING THE TIME IN WHICH AN ANTI-PINCHING SYSTEM CAN OPERATE

BACKGROUND OF THE INVENTION

The subject of the present invention is an electric window regulator for a motor vehicle, comprising a mechanism for driving the window, an electric motor that provides a motive force to the driving mechanism, provided with an anti-pinching system which can be triggered in the event of a hard obstacle interfering with the travel of the window, and an electronic circuit for control of the motor and of the anti-pinching system.

It is known that electric window regulators for motor vehicles are increasingly subject to regulations limiting the pinching force allowable between the window and the door frame to a maximum value. Such regulations address situations involving obstacles characterized by stiffnesses of 10, 20 or 60 N/mm, that is to say obstacles of varying degrees of hardness.

In a window regulator of the type with cables associated with one or two guide rails fitted with one or two runners supporting the window, springs are interposed between the motor unit and the ends of the sheaths enveloping the cables. The spring associated with the upper cable maintains the tension in it during lowering, and, during raising, is continuously fully compressed, under a transfer force of about 80 Newtons, while the lower spring tensions the corresponding cable during raising. This is because the stiffness of the helical springs usually used is from 2 to 5 N/mm, and these springs are produced in such a way as to reach end of travel when they are subjected to sufficient compression, under a force of 25 to 50 Newtons at most.

It can thus be understood that, in the event of a hard obstacle with stiffness greater than 20 Newtons per millimeter, these springs do not in fact fulfil the function of an impact damper. The impact and the pinching which ensue are of such abruptness that the electronic circuit cannot trigger the anti-pinching system as rapidly as might be wished. This may entail physical injury if a person's hand or head is thus pinched between the window and the door frame of the vehicle.

A system comprising a damper made of flexible material is known from the patent U.S. Pat. No. 5,296,658, this damper being applied to the door seal and containing electrical conductors which come into mutual contact in the event of an obstacle interfering with the travel of the window, causing the damper to be squeezed. The electrical conductors are associated with a switch, opening of which causes the drive motor to be cut off. Such a device thus employs an electrical circuit but does not make any provision for effectively reducing the impact of the obstacle.

The patent FR-A-2 693 535 also describes an electromechanical system which detects the obstacle and cuts off a switch which causes the drive motor to be reversed. As in the device of the preceding patent, this system does not allow the stiffness to be reduced and employs electrical means.

The patent EP-A-0 579 518 describes a safety device for electric window regulators employing general means similar to those described in the abovementioned patents, but with a guide rail which can be shifted downwards in the event of an obstacle whose stiffness exceeds a predetermined value. This downwards shifting of the rail actuates electromechanical means which automatically reverse the direction of rotation of the motor.

The patent EP-A-0 604 272 teaches a window regulator device for a vehicle the kinematic linkage of which comprises a flexible element for force-limiting and damping a hard impact between the window and a hard obstacle. This flexible element is configured to limit the force to about 100 Newtons so as to form an anti-pinching safety system preventing the hard impact.

This flexible element may, for example, be a flat spring capable of bending upon a hard impact suffered by the window, to which corresponds a shifting of the elements constituting the window regulator.

These devices, however, exhibit the drawback of reaching end of travel at the maximum forces allowed for the pinching, that is to say 100 Newtons and even below this maximum force. It results therefrom that such springs to not fulfil a damping function, with the drawbacks already set out (impacts and abrupt pinching preventing the electronic anti-pinching circuit from triggering within the desired timescale, with the risk of physical injury).

SUMMARY OF THE INVENTION

Hence the object of the invention is to propose a satisfactory solution to this problem.

In accordance with the invention, the electric window regulator comprises mechanical means limiting the obstacle stiffness in order to reduce the pinching forces on hard obstacles, by mechanically converting the impact with a hard obstacle into the impact with a less hard obstacle while the window is rising, and the mechanical means are formed in such a way as not to reach an end of travel under a predetermined allowable maximum pinching force.

The invention applies to any type of window regulator equipped with an anti-pinching system on the motor: speed sensor, torque sensor, current-consumption reading, etc. In this type of device, the greater the stiffness of the obstacle, the higher the pinching force.

In the case of a window regulator of the type with a cable driving a window-support runner sliding on at least one guide rail, the mechanical obstacle-stiffness limiting means consist of a spring of the upper cable having a stiffness of at least about 10 N/mm and formed in such a way as to reach end of travel only under a compression force of least about 250 Newtons.

It is known that the stiffness K of a spring is defined by the following relationship:

$$K = \frac{F + 100}{d}$$

F being the force for raising the window, d the damping travel of the spring until it reaches end of travel under a compression force, and 100 being the number of-Newtons corresponding to the maximum pinching force allowable according to the European and American standards.

Hence, in the case of a window regulator of the type with a cable and guide rail, the spring associated with the upper cable in accordance with the invention is no longer at end of travel during the raising phase under a transfer force of about 80 N to 150 Newtons. Hence it then functions as a damper, converting a hard impact into a soft impact, in addition to its function of maintaining the tension in the cable. That being so, 4*a* defined torque value, higher than the normal operating torque of the motor while the window is being raised, is reached as a consequence of a hard obstacle only after a time interval longer than the time interval corresponding to a spring according to the state of the prior art, which would already be constantly fully compressed during the normal raising of the window with no obstacle. It results therefrom that the electronic circuit has a longer time in order effectively to trigger the anti-pinching system and thus to avoid any risk of physical injury.

Other features and advantages of the invention will emerge in the course of the description which will follow, given with reference to the attached drawings which illustrate several embodiments thereof by way of non-limiting examples.

DETAILED DESCRIPTION OF THE PREFERRED EMBODIMENTS

Figure 1:
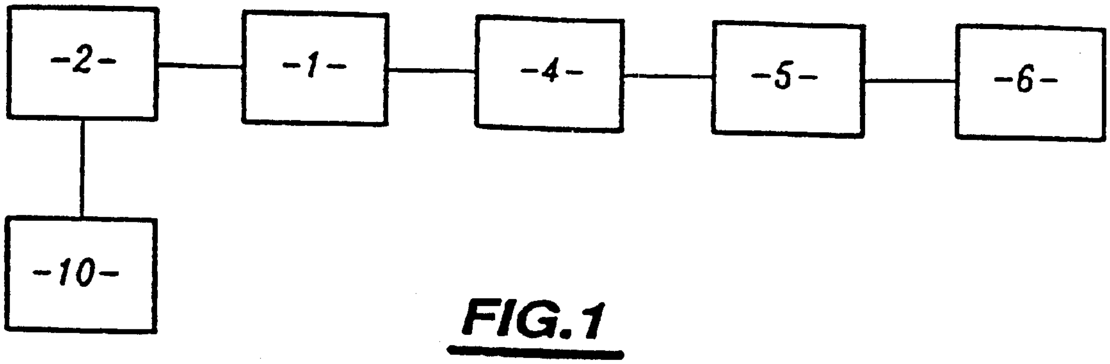
FIG. 1 is a block diagram illustrating the kinematic linkage of the window regulator according to the invention.

The linkage block diagram of FIG. 1 includes a window-regulator mechanism 1, a motor 2 for driving the mechanism 1, equipped with an anti-pinching system, and linked to an electronic circuit 10 for management and control of the anti-pinching system. The linkage also comprises a window 4 linked to the window-regulator mechanism 1, with any obstacle 5 having a defined stiffness possibly being interposed between the window 4 and the door frame 6.

Figure 2:
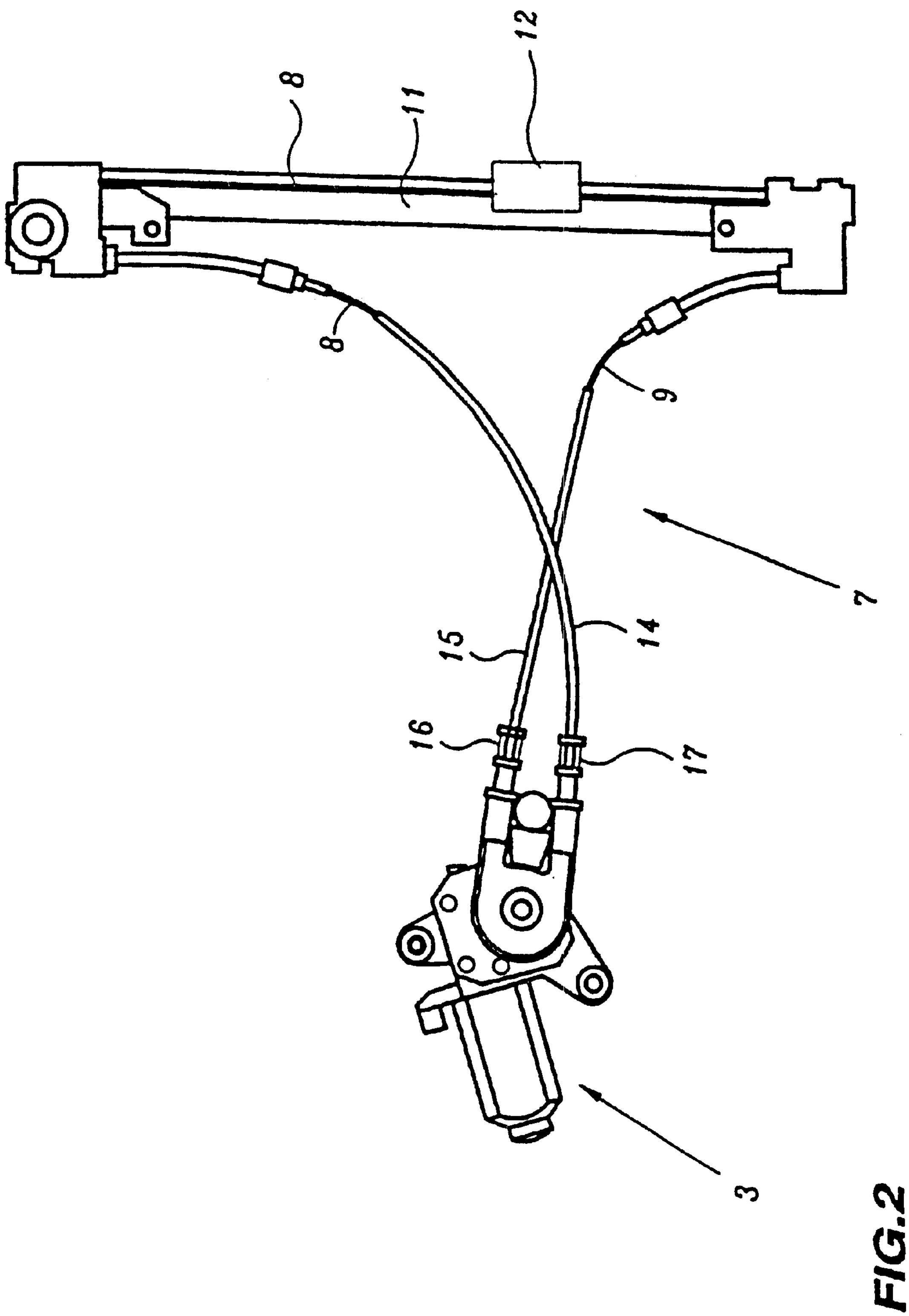
FIG. 2 is a simplified view in elevation of a window regulator of the type with cables and vertical rail for guiding a window-support runner, capable of being equipped with a first embodiment of the obstacle-stiffness limiting means in accordance with the invention.

FIG. 2 illustrates a first embodiment of the invention, in which the window regulator 7 is of the type with upper and lower cables 8, 9 respectively, and guide rail 11 for a runner 12. The latter is mechanically integral with cables 8, 9, and can slide vertically on the rail 11 (the window carried by the runner 12 not being represented).

The window regulator also comprises a geared-down drive motor 3, which exerts, on the cables 8, 9, traction forces for driving the runner 12 and the window in raising or lowering travels. The cables 8, 9 are arranged in respective sheaths 14, 15, and helical springs 16, 17 are arranged around the respective cables 8, 9, between the ends of the sheaths 15, 14 and the motor unit 3. The spring 16 associated with the lower cable 9 is a standard spring, having the usual characteristics of stiffness and of end of travel of existing springs (stiffness 2 to 5 N/mm, and end of travel for compression forces between 25 and 50 Newtons maximum).

In contrast, the helical spring 17 of the upper cable 8 exhibits the technical characteristics envisaged by the invention: stiffness of at least about 10 N/mm, preferably 10 to 15 N/mm, and it is produced in such a way as to reach end of travel only under a compression force of at least about 250 Newtons.

Hence, in the event that a hard obstacle 5 comes to be interposed between the window 4 and the door frame 6, with a stiffness of 10, 20 or 65 N/mm, and an associated compression force having an amplitude of 100 Newtons which is the maximum standard allowed as already stated, the spring 17 undergoes compression travel, but cannot come as far as an end of travel position. It then functions as a damper which mechanically converts the impact with the relatively hard obstacle into an impact with a less hard obstacle, thereby reducing the pinching force.

Figure 5:
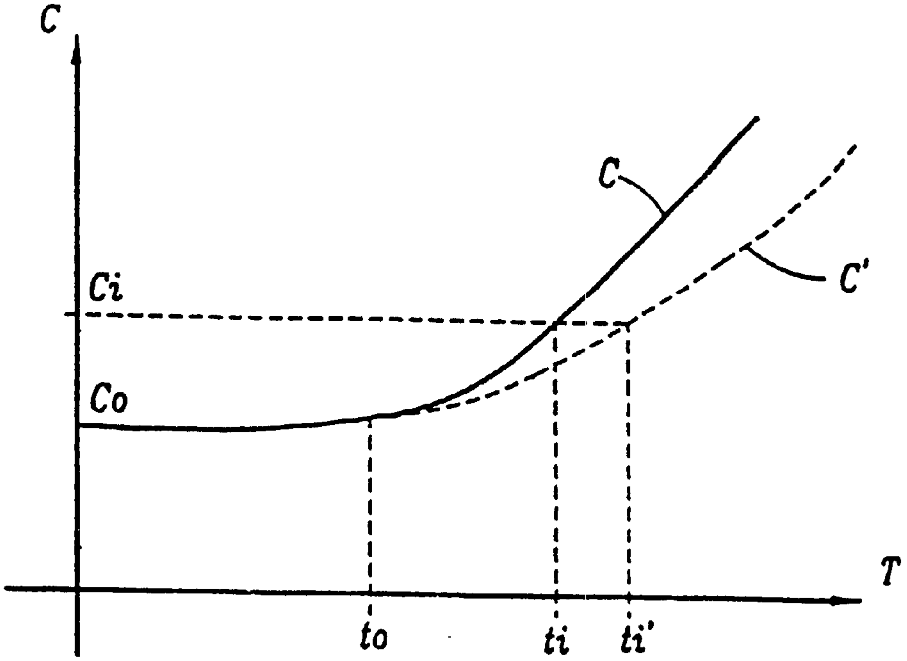
FIG. 5 is a diagram illustrating the variation in the torque of the geared-down motor of the window regulator as a function of time in the case of a hard obstacle, with and without the stiffness-limiting means provided by the invention.

This operation is illustrated by the diagram of FIG. 5, on which the curve in solid line shows the variation in the torque C developed by the geared-down motor 3 on the upper cable 8 while the window 4 is being raised, as a function of time T, and from a time t0 at which the window encounters a hard obstacle, having a stiffness of, for example, 65 N/mm.

With a spring according to the prior art, the torque $C_i$, greater than the torque $C_0$ at the instant $t_0$, is reached at a time $t_i$. In contrast, with a spring 17 exhibiting the mechanical characteristics according to the invention as shown in the curve C', the torque $C_i$ is reached only after a time ti'>ti, since the spring functions as a damper which slows down the increase in the torque from the motor 3. Hence, by virtue of the means of limiting the stiffness of the hard obstacle encountered, the electronic circuit 10 has a longer time available to react, which makes it possible to reduce the pinching forces and to avoid any risk of physical injury.

Figure 3:
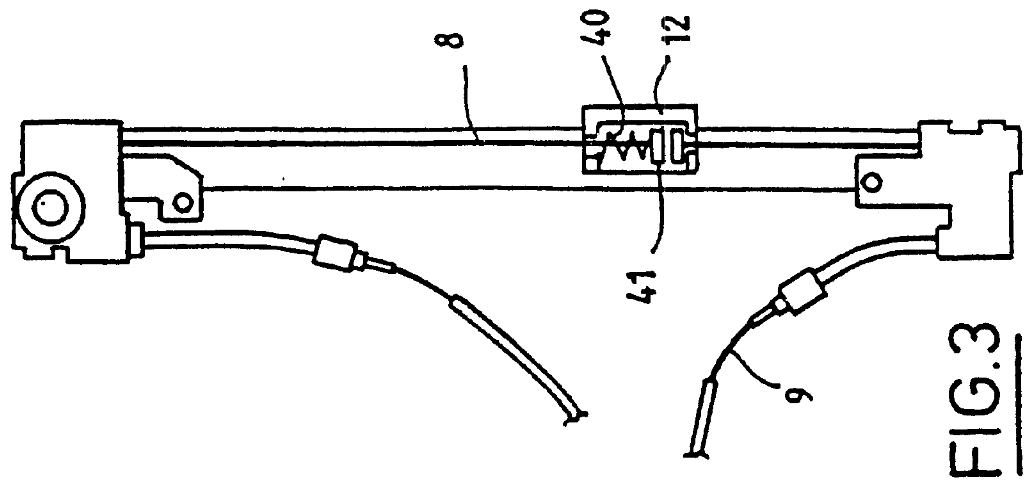
FIG. 3 is an illustration in partial elevation similar to FIG. 2 illustrating selecting components of another example embodiment of the invention.

The second embodiment of the window regulator illustrated in FIG. 3 differs from the preceding one in the fact that the mechanical obstacle-stiffness limiting means comprise a spring 40 interposed between a stop 41 of the upper cable 8 and the runner 12, this (helical) spring 40 having a stiffness of at least 10 Newtons/mm.

In this embodiment, the spring 17 can then be either dispensed with, or replaced by a spring similar to the spring 16.

Figure 4:
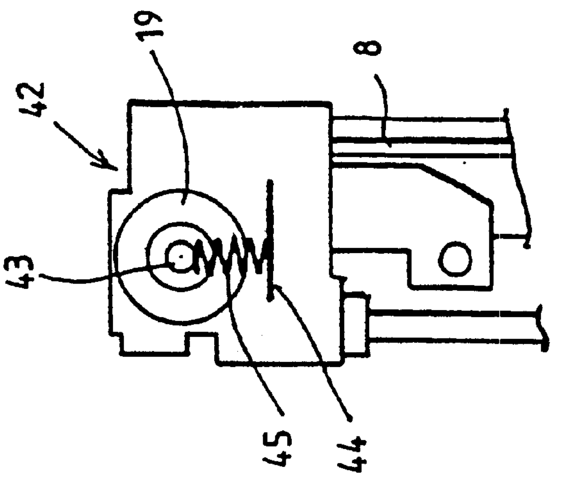
FIG. 4 is a partial elevation view illustrating selecting components of an embodiment similar to FIG. 2, highlighting the differences between the example embodiment of FIG. 4 and that of FIG. 2.

In the third embodiment of the invention (FIG. 4), (as well as in those of FIGS. 2 and 3), the rail 11 is equipped at its ends with an upper pulley 42 and with a lower pulley (not visible) for returning the cables 8 and 9. These pulleys are articulated around shafts such as 43 in the case of the pulley 42, the shaft 43 resting on a support 44 (as for the lower pulley). The obstacle-stiffness limiting means in this embodiment comprise a spring 45 interposed between the shaft 43 of the upper pulley 42 and its support 44, and having a stiffness of at least 20 Newtons/mm. This is because this spring has to add the force of the two cables 8, 9.

In this embodiment, the spring 17 can be dispensed with.

Figure 6:
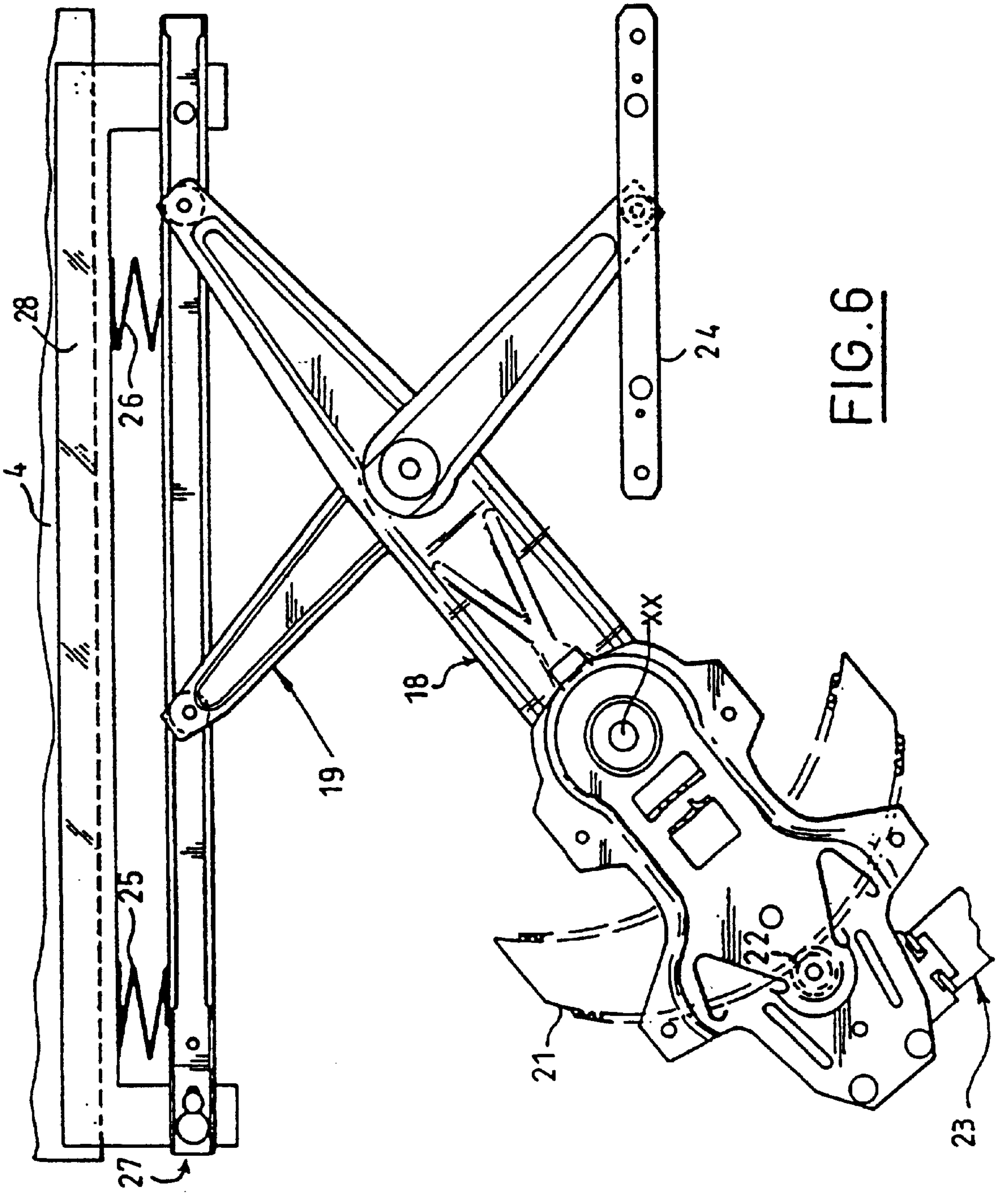
FIG. 6 is a simplified elevation view of a window regulator of the type with X-shaped oscillating arms, equipped with stiffness-limiting springs in accordance with a fourth embodiment of the invention.

FIG. 6 represents a window regulator of the type with oscillating arms 18, 19 arranged in an X in a known way. The main arm 18 is articulated on a plate about a shaft XX, while the second arm 19 consists of two half-arms integral with one another and articulated about the same axis on the main arm 18, with which it forms an X-shaped structure.

The main arm 18 is equipped with a toothed sector 21 which interacts with an output pinion 22 of a geared-down drive motor 23. The lower end of the lower half-arm of the arm 19 is fitted with a roller sliding in a horizontal rail 24, and the upper ends of the arms 18 and 19 are equipped with rollers sliding in a horizontal window rail 27. A window base 28 is integral with the window 4 and mounted at its ends sliding vertically on the rail 27.

Between the window base 28 and the rail 27 at least one helical spring 25, and preferably two springs 25, 26, having the characteristics of stiffness and of end of travel force mentioned above in the case of the spring 17, is (are) provided. In the event of a hard obstacle encountered by the window 4 during raising travel of the window regulator, the spring or springs 25, 26 constitute a damper allowing relative movement between the rail 27 and the window base. This movement mechanically converts the hard obstacle into a relatively soft obstacle, thus making it possible to reduce the pinching forces.

In the case of an obstacle having a stiffness of 65 N/mm, and triggering the maximum force of 100 Newtons allowed by the European and American standards, the compression travel of the spring 17, 25 or 26 is thus of about 1.5 mm without this spring reaching its end of travel in any way.

Figure 7:
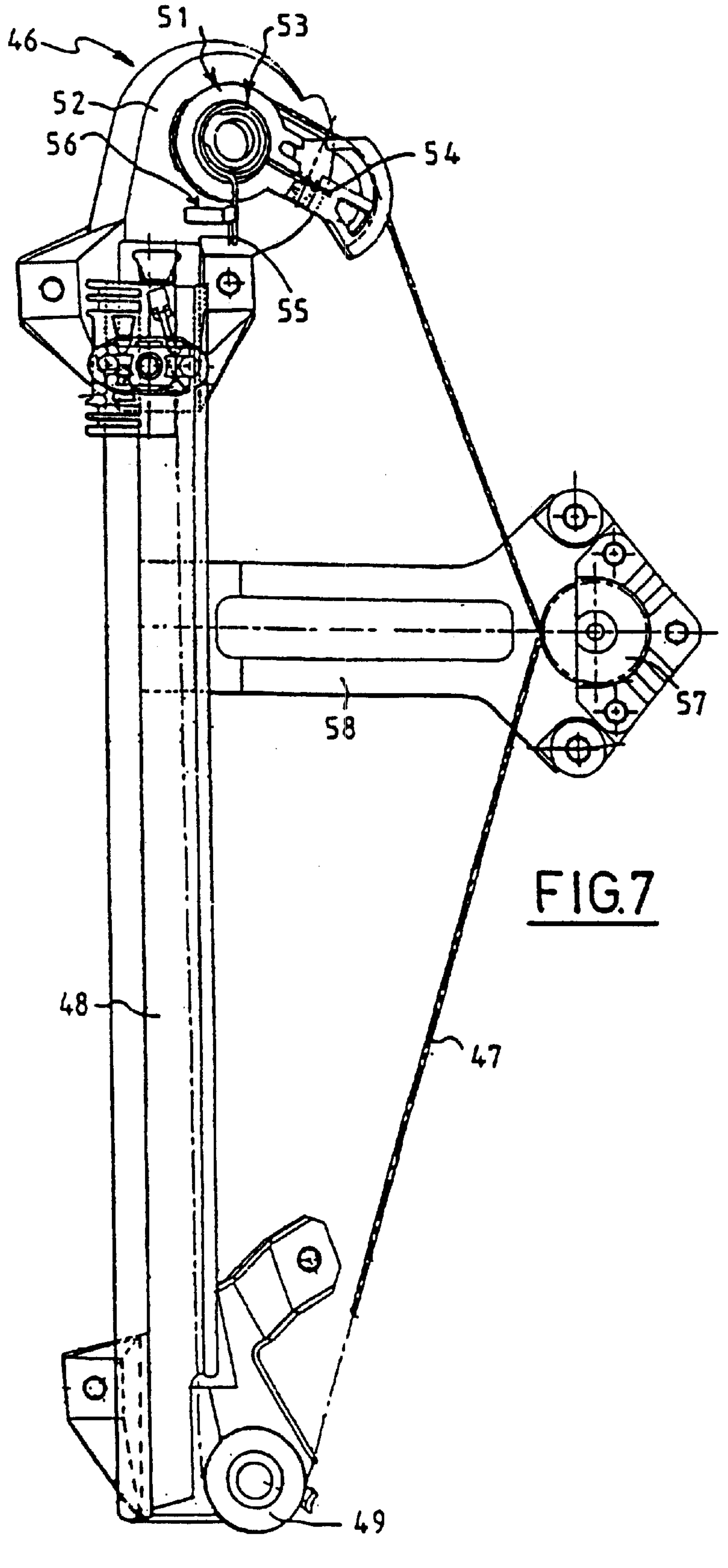
FIG. 7 is an elevation view illustrating a fifth embodiment of the window regulator according to the invention.

In the fourth embodiment of the invention illustrated in FIG. 7, the window regulator comprises a cable-tensioning device as described in the patent FR-A-2 733 292 (95 04 749) of Apr. 20, 1995. That being so, its detailed description will not be repeated here.

The device 46 tensioning the cable 47 is associated with a rail 48 having at its ends a return pulley 49 for the cable 47 and a cam 51, also a return cam for the opposite end of the cable 47, this cam being articulated so as to rotate on a plate 52 constituting the end of the rail 48. The cam 51 is equipped with a torsion spring 53 coaxial with the cam 51 and which has two radial tabs 54, 55, arcuately spaced.

One of these tabs, namely the tab 55, bears on a stop abutment 56 formed on the support element consisting of the plate 52, while the second tab 54 extends inside the cam 51.

The cable 47 is engaged in a window-regulator drive system 57 carried by a plate 58 fixed to the rail 48 transversely to it.

The torsion spring 53 has a stiffness equivalent to at least 10 Newtons/mm for a compression spring on the cable 47, and which would reach end of travel under a force of about 250 Newtons.

In addition to the conventional function of maintaining tension in the upper cable, and the supplementary function according to the invention of a damper mechanically converting a hard obstacle into a relatively soft obstacle, the spring(s) envisaged by the present invention advantageously fulfills a third function. This is because it constitutes a filter against inadvertent triggering of the anti-pinching mechanism equipping the window regulator. This is because, in the event of the vehicle traveling over rough terrain for example, setting up substantial jolting, the jolts cause the window to oscillate, which in turn may entail significant variations in the transfer force from the window regulator to the anti-pinching mechanism, which can thus be triggered inadvertently. The stiffness-limiting spring according to the invention avoids such risks, since it filters the variation in the force read by the motor and by its anti-pinching system, which will thereby not be triggered unless really necessary.

The invention is not limited to the embodiments described and may include embodiment variants. It is applicable particularly to window regulators with two guide rails, known as "double lift" types.

What is claimed is:

1. An electric window regulator assembly, comprising:

a driving mechanism that is adapted to move a window;

an electric motor that provides a motive force to the driving mechanism;

an anti-pinching system that is triggered in response to an obstacle interfering with travel of the window;

an electronic circuit that controls the motor and the anti-pinching system;

a profiled rail;

a base adapted to support the window relative to the profiled rail;

generally x-shaped oscillating arms, at least one of said arms being linked to the drive motor, the upper ends of said arms sliding in the profiled rail; and said anti-pinching system including at least one spring interposed between the rail and the base for increasing a time in which said anti-pinching system can operate before the window pinches the obstacle, the spring having a selected stiffness, the spring fully compressing only under a compression force exceeding a selected threshold.

2. The assembly of claim 1, wherein the spring comprises a helical spring.

3. The assembly of claim 1, wherein said at least one spring comprises two helical springs interposed between the rail and the base.

4. The assembly of claim 1, wherein the at least one spring is further operative as a filter against inadvertent triggering of the anti-pinching system.

5. The assembly of claim 1, wherein the selected stiffness is at least about 10 N/mm and the selected compression force threshold is about 250 Newtons.

* * * * *